(12) United States Patent
Fang

(10) Patent No.: US 9,245,049 B2
(45) Date of Patent: Jan. 26, 2016

(54) PERFORMING QUERIES USING SEMANTICALLY RESTRICTED RELATIONS

(75) Inventor: Jun Fang, Xi'an (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 654 days.

(21) Appl. No.: 13/496,773

(22) PCT Filed: Feb. 16, 2011

(86) PCT No.: PCT/CN2011/071013
§ 371 (c)(1),
(2), (4) Date: Mar. 16, 2012

(87) PCT Pub. No.: WO2012/109786
PCT Pub. Date: Aug. 23, 2012

(65) Prior Publication Data
US 2012/0278273 A1 Nov. 1, 2012

(51) Int. Cl.
*G06N 5/04* (2006.01)
*G06F 17/30* (2006.01)

(52) U.S. Cl.
CPC ............ *G06F 17/30958* (2013.01); *G06N 5/04* (2013.01)

(58) Field of Classification Search
CPC .................... G06F 17/30734; G06F 17/30737; G06N 5/04
USPC .......................................................... 706/45
See application file for complete search history.

(56) References Cited

U.S. PATENT DOCUMENTS

| 7,549,309 | B2 | 6/2009 | Beringer et al. | |
|---|---|---|---|---|
| 2004/0093328 | A1 | 5/2004 | Damle | |
| 2006/0217818 | A1 | 9/2006 | Fujiwara | |
| 2008/0189265 | A1* | 8/2008 | Taranov et al. | 707/5 |

FOREIGN PATENT DOCUMENTS

| CN | 1726508 A | 1/2006 |
|---|---|---|
| CN | 1794240 A | 6/2006 |
| CN | 1952928 A | 4/2007 |
| CN | 101398858 A | 4/2009 |
| EP | 1510941 A1 | 3/2005 |
| JP | 11-096177 A | 9/1999 |
| JP | 2010-205265 A | 9/2010 |
| JP | 2010-277332 A | 9/2010 |

OTHER PUBLICATIONS

C.B. Necib and J.C. Freytab, "Ontology Based Query Processing in Database Management Systems", CoopIS/DOA/ODBASE 2003, R. Meersman et al. (Eds.), pp. 839-857, 2003.*
Fernandez et al., "Methontology: Form Ontological Art Towards Ontological Engineering", AAAI Technical Report SS-97-06, pp. 1-8, 1997.*

(Continued)

*Primary Examiner* — Kakali Chaki
*Assistant Examiner* — Vincent Gonzales
(74) *Attorney, Agent, or Firm* — Maschoff Brennan

(57) ABSTRACT

Techniques for searching large data sets. A semantically restricted relation graph is generated for an ontology. Queries to the ontology are resolved using the semantically restricted relation graph.

18 Claims, 8 Drawing Sheets

(56) References Cited

OTHER PUBLICATIONS

T. Gruber, "A Translation Approach to Portable Ontology Specification", Knowl. Sys. Lab., Tech. Report KSL 92-71, Sep. 1992, Revised Apr. 1993, 27 pages.*
International Search Report dated Nov. 24, 2011 as received in application No. PCT/CN2011/071013.
Written Opinion of the International Searching Authority dated Nov. 24, 2011 as received in International application No. PCT/CN2011/071013.
Eiter, et al., "Conjunctive Query Answering in the Description Logic SH Using Knots", Infsys Research Report 1843-09-03 , Sep. 2009, pp. 37.
Calvanese, et al., "Conjunctive Query Containment and Answering under Description Logic Constraints", ACM Transactions on Computational Logic, vol. V, No. N, Jan. 2007, pp. 1-30.
Yu, et al., "Multi-Label Informed Latent Semantic Indexing", ACM, 2005, pp. 8.
Donini, F.: Complexity of reasoning. In Baader, F., Calvanese, D., McGuinness, D., Nardi, D., Patel-Schneider, P., eds.: Description Logic Handbook. Cambridge University Press (2002) 101-141.
David Vallet, Pablo Castells, Miriam Fernández, Phivos Mylonas, Yannis S. Avrithis: Personalized Content Retrieval in Context Using Ontological Knowledge. IEEE Trans. Circuits Syst. Video Techn. 17(3): 336-346 (2007).
Phivos Mylonas, David Vallet, Pablo Castells, Miriam Fernández, Yannis S. Avrithis: Personalized information retrieval based on context and ontological knowledge. Knowledge Eng. Review 23(1): 73-100 (2008).
Tim Berners-Lee, J. Hendler, and O. Lasilla. The Semantic Web. Scientific American, May 2001.
Baader, F., Calvanese, D., McGuinness, D.L., Nardi, D., Patel-Schneider, P.F., eds.: The description logic handbook: theory, implementation, and applications. Cambridge University Press, New York, USA (2003).
K Ramasamy, "Efficient storage and query processing of set-valued attributes", Ph.D. thesis Comp. Sci, University of Wisconsin Madison (2001).
Horrocks, I., Tessaris, S.: Querying the semantic web: a formal approach. In Horrocks, I., Hendler, J., eds.: Proc. of the 1st Int. Semantic Web Conf. (ISWC 2002). No. 2342 in Lecture Notes in Computer Science, Springer-Verlag (2002) 177-191.
Baader, F., Calvanese, D., McGuinness, D.L., Nardi, D., Patel-Schneider, P.F., eds.: The description logic handbook: theory, implementation, and applications. pp. 43-95, Cambridge University Press, New York, USA (2003).
"Description Logic", accessed at https://web.archive.org/web/20110211104143/http://en.wikipedia.org/wiki/ Description_logic Last modified on Jan. 27, 2011, pp. 1-9.
"Ontology (information science)," accessed at https://web.archive.org/web/20101104095918/http://en.wikipedia.org/wiki/Ontology_ (computer_science), Last modified on Oct. 22, 2010, pp. 1-7.

* cited by examiner

PERFORMING QUERIES USING SEMANTICALLY RESTRICTED RELATIONS

BACKGROUND

The World Wide Web ("Web") provides a wealth of information and services to people around the world. The ability to discover information from around the globe often requires no more than a click of a mouse. At the same time, the Web is best suited for use by people. For example, tasks such as finding a specific translation of a word, searching for the lowest price for an item, or making reservations at a restaurant or with an airline are often difficult for a machine to accomplish without human assistance.

As a result, work is being done to make the Web more understandable. The Semantic Web, for example, tries to provide a framework to make the Web more understandable to both humans and machines by defining the meaning of information and services available on the Web. The goal is to enable the understanding and satisfaction of requests from various sources. The Semantic Web aims to enable machines, for example, to perform some of the tasks that are performed by humans today.

Making the Web more understandable has many applications that include data integration, data classification, searching, content rating, data description, or the like. In order for these applications to come to fruition, however, it is necessary to identify the meaning or semantics of data and/or services on the Web.

In the Semantic Web, a semantic search enables users to represent their search more accurately than in traditional keyword search techniques. The results of the semantic search should be more accurate and relevant. The ability to conduct more meaningful searches is very attractive. Unfortunately, semantic searches (and other applications of the Semantic Web) are hindered by the size of the data sets being searched. As a result, the ability to scale a semantic search or other semantic applications to large data sets is a significant problem.

For example, the process of performing a semantic search is often achieved by reducing the semantic search to a set of consistency checking problems. Unfortunately, performing a consistency check on millions, if not billions of individuals, effectively makes the scalability issue intractable. In other words, performing the set of consistency checking problems on each individual is time consuming and unsatisfactory, particularly as the size of the data set being used becomes large.

SUMMARY

Embodiments relate to information retrieval from large data sets including answering queries to an ontology using semantic relations in the ontology. In an embodiment, a method for preparing an ontology for searching is provided. The method may begin by compressing the ontology. In a compressed ontology, one individual in each set of semantically equivalent individuals in the original ontology remains in the compressed ontology. Next, semantic relations among the individuals in the compressed ontology are determined Semantically equivalent concepts and semantic relations among concepts in the compressed ontology are also determined. A semantically restricted relation graph can then be constructed based on the semantic relations determined from the compressed ontology. A query can be answered using the semantically restricted relation graph.

In an embodiment, a method for performing a query in an ontology may begin by receiving a query at a server that provides access to the ontology. The query is transformed into a set of consistency checking problems. The method then performs the set of consistency checking problems using a semantically restricted relation graph. The semantically restricted relation graph includes semantically restricted relations determined from the ontology. Each set of semantically equivalent individuals in the ontology are represented by one individual in the semantically restricted relation graph. An answer to the query is then determined from the semantically restricted relation graph.

In an embodiment, a system for performing a query in a large data set is provided. The system includes a server that has access to a database that stores an ontology. A graphing component is configured for generating a semantically restricted relation graph from the ontology. The semantically restricted relation graph is stored in the memory and includes semantically restricted relations among individuals and semantically restricted relations among concepts. Some of the semantically equivalent individuals in the ontology are excluded from the semantically restricted relation graph. The system also includes a query component that interfaces with the semantically restricted relation graph. The query component transforms the query into a set of consistency checking problems that are performed on the semantically restricted relation graph to generate results of the query.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
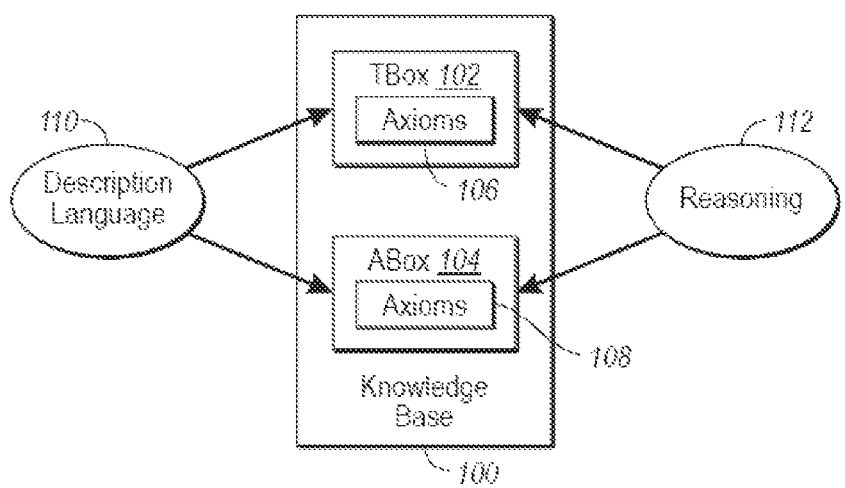
FIG. 1 shows an illustrative example of a knowledge base.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Embodiments disclosed herein relate generally to accessing data, including large data sets. Embodiments relate to performing queries in large data sets, which includes performing queries in an ontology and/or preparing the ontology for access.

Performing a semantic search, such as a query, in the ontology can be reduced to a set of consistency checking problems. The ability to access data in the ontology or to perform the semantic search is improved by reducing consistency checking requirements. The consistency checking requirements can be reduced, as disclosed herein, by exploring semantic relations among entities (e.g., concepts, individuals, relations, etc.) in the ontology.

The information obtained from the exploration of the semantic relations can be used to compress the ontology. The ontology can be compressed, for example, by eliminating some of the semantically equivalent individuals. After the ontology is compressed, a semantically restricted relation graph can be constructed by further exploring semantic relations among individuals and/or concepts in the ontology.

Any query submitted to the ontology can then be optimized by answering the query according to the semantically restricted relation graph rather than according to the entire ontology. Advantageously, embodiments are not limited to any particular logic language or knowledge base and there is no reliance on any specific language.

FIG. 1 shows an illustrative example of a knowledge base 100. The knowledge base 100 (which may also referred to herein as an ontology) can be represented has having two parts: a terminology box 102 (TBox 102) and an assertion box 104 (ABox 104). The Tbox 102 may contain axioms 106 that define concepts in the knowledge base 100 and that define roles or relations between concepts. The ABox 104 contains axioms 108 that may use concepts or relations in the TBox 102 to assert individuals in the knowledge base 100. The TBox 102 and/or the ABox 104 can be represented in different forms including, by way of example only, graphical and/or syntactical forms.

The axioms 106 and 108 are often constructed using a predefined or predetermined syntax, such as a description language 110. Reasoning 112 can be performed on the knowledge base 100. Reasoning 112 may be used, for example, to answer a query to the knowledge base 100 and may include performing consistency checks in the knowledge base 100 based on the query.

One of skill in the art can appreciate that symbols such as ô, Π, ∀, and ¬ are examples of symbols in description logics that may be used in the description language 110. One of skill in the art can appreciate that the description language 110 is not limited to these specific symbols. Symbols used in description logics are well known to one of skill in the art and need not be set forth in detail herein.

The following set of axioms is an example of the knowledge base 100, which is directed to the topic or subject of a family. In this example, the knowledge base 100 may contain the following axioms:

α1: Mother ô Woman
α2: Man ΠWoman ô τ
α3: MotherwithoutDaughter ô Mother
α4: MotherwithoutDaughter ô ∀ hasChild. ¬ Woman
α5: MotherwithoutDaughter(Mary)
α6: hasChild(Mary, Peter)

In the above example of the knowledge base 100, axioms α1 to α4 are examples of the axioms 106 in the TBox 102. Axioms α5 to α6 are examples of the axioms 108 in the ABox 104. The axiom α1 states that Mother is a subclass of Woman. The axiom α2 states that Man and Woman are disjointed—an individual cannot belong to both of them. The axiom α3 states that MotherwithoutDaughter is a subclass of Mother. The axiom α4 MotherwithoutDaughter is a woman whose children are not women.

The axiom α6 is an example of a relation and all other axioms in the TBox 102 and the Abox 104 are concepts or assertions of individuals in this example. The axiom α5 uses the concept MotherwithoutDaughter to assert that Mary (an individual in this example) is a MotherwithoutDaughter. The axiom α6 uses the relation hasChild to assert that Mary has a child Peter. It can be deduced, through reasoning, that Peter is a Man although this assertion is not explicitly presented in the knowledge base 100.

Figure 2:
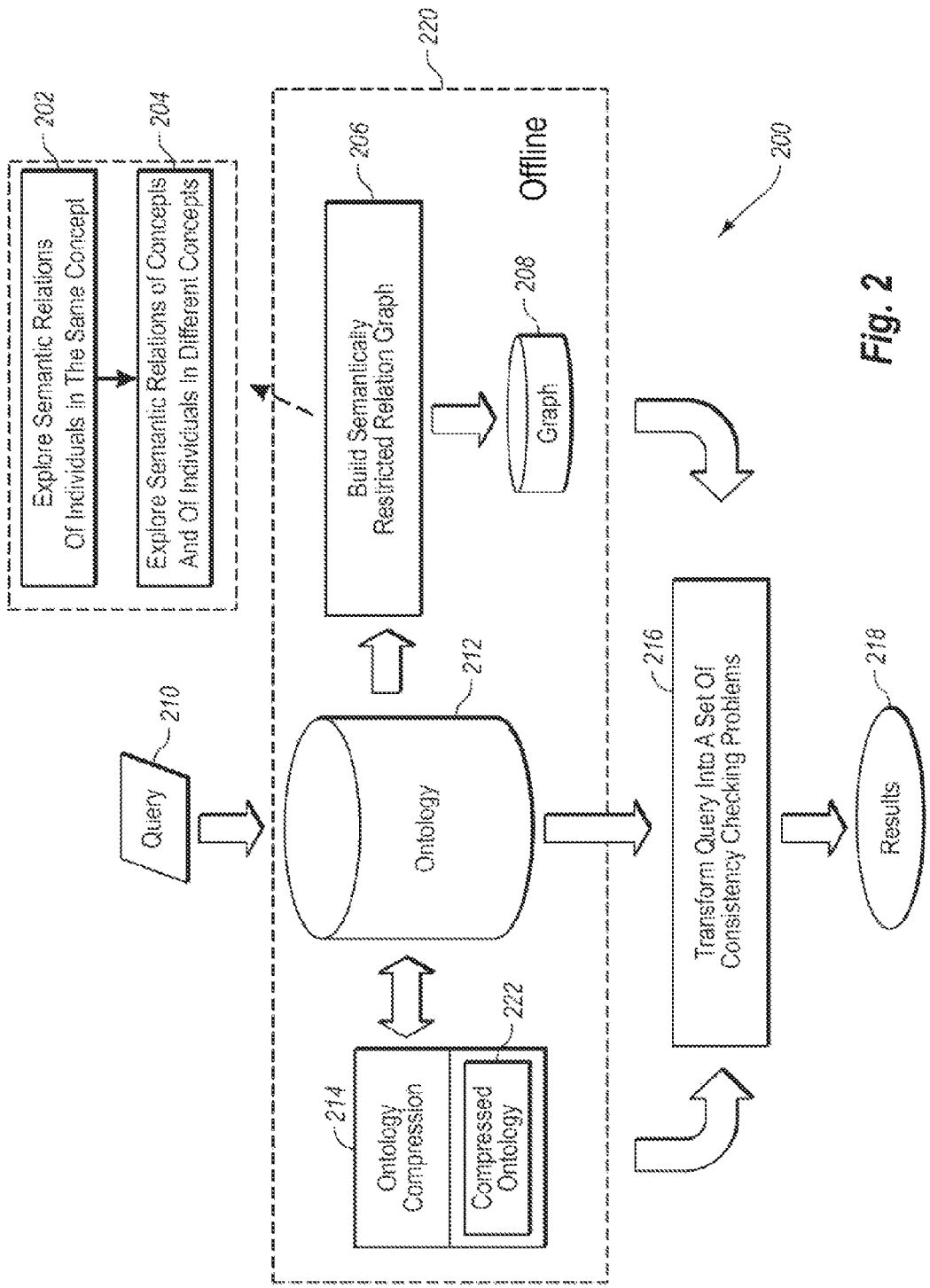
FIG. 2 shows an illustrative example of a system for performing a query in an ontology using semantic relations.

FIG. 2 shows an illustrative example of a system 200 for performing a query 210 in an ontology 212 using semantic relations. In this example, the query 210 can be resolved using a semantically restricted relation graph 208 (graph 208). The graph 208 may be generated offline 220. In other words, the generation of the graph 208 can be performed offline in the context of answering the query 210. By generating the graph 208 offline, the query 210 can be resolved or answered more quickly compared to generating the graph 208 after receiving the query 210. If necessary, the graph 208 can be updated over time as additional data is added to the ontology 212.

The ontology 212 is an example of the knowledge base 100. In box 206 (Build Semantically Restricted Relation Graph), semantic relations in the ontology 212 are explored to build the graph 208. The process of generating the graph 208 includes, by way of example only: ontology compression as illustrated in box 214; exploring semantic relations of individuals in the same concept as illustrated in box 202; and exploring relations of individuals among different concepts as illustrated in box 204.

Ontology compression, as shown in box 214, generates a compressed ontology 222 by exploring some of the semantic relations in the ontology 212. In generating the compressed ontology 222, semantically equivalent individuals in the ontology 212 are grouped as the same individual or as one individual. Alternatively stated, one individual from a group of semantically equivalent individuals in a given concept is retained in the compressed ontology 222. The compressed ontology 222 aids the resolution of the query 210 because it removes semantically equivalent individuals from consideration when resolving the query 210. The removal of semantically equivalent individuals reduces the consistency checking requirements associated with the resolution of the query 210.

Semantic relations often establish or identify relationships between individuals and/or concepts in the ontology 212. Semantic relations can identify individuals and/or concepts as being semantically equivalent, semantically less restrictive, or semantically more restrictive than other individuals and/or concepts. Thus, semantic relations also include semantically restricted relations.

A semantically restricted relation can be defined as follows. In an ontology Σ (e.g., the ontology 212), where e1 and e2 are two entities (each entity may be, by way of example only, an individual or a concept) in the ontology Σ, let S(e) denote all axioms which contain e in the ontology Σ. In this example, $S(e)^{s \to s'}$ represents replacing symbol s with s' for all axioms in S(e).

If $S(e1)^{e1 \to e2} = S(e2)$, then e1 and e2 are semantically equivalent, denoted by $e1 \leftrightsquigarrow e2$. (1)

If $S(e1)^{e1 \to e2} \supseteq S(e2)$, then e1 is more semantically restricted than e2, denoted by $e1 \leftharpoonup e2$; (2)

If $S(e1)^{e1 \to e2} \subseteq S(e2)$, then e2 is more semantically restricted than e1, denoted by $e1 \rightharpoonup e2$. (3)

Exploring semantic relations of individuals in the same concept, as illustrated in box 202, can be conducted on the ontology 212. When two individuals in the ontology 212 or in the same concept of the ontology 212 have a semantically restricted relation, consistency checking on the individuals will also be related. In one sense, performing a consistency check on one individual generates the same result that would be generated if the consistency check were performed on a semantically equivalent individual. The ontology Σ can be compressed by removing semantically equivalent individuals.

More specifically, given the ontology Σ and a query Q(x), where a1 and a2 are two individuals in the ontology Σ, consistency checking can be reduced when individuals are semantically related. The following definitions can be used to reduce the number of consistency checking by using semantically restricted relationship among individuals in the ontology Σ.

If $a1 \leftrightsquigarrow a2$, then $\Sigma \models Q(a1) \Leftrightarrow \Sigma \models Q(a2)$ (semantically equivalent). (4)

If $a1 \leftharpoonup a2$, then $\Sigma \models Q(a1) \Leftarrow \Sigma \models Q(a2)$ (a1 is more semantically restricted than a2). (5)

If $a1 \rightharpoonup a2$, then $\Sigma \models Q(a1) \Rightarrow \Sigma \models Q(a2)$ (a2 is more semantically restricted than a1). (6)

The forgoing definitions can be used to determine whether any two individuals in the same concept of the ontology 212 are semantically equivalent. In addition, results of the consistency checking may also obtained for other individuals that are semantically related without having to perform the consistency checking. In other words, the system 200 reduces the consistency checking requirements for the query 210 and it is no longer necessary to perform consistency checking for all individuals in the ontology 212 with respect to a query such as the query 210.

Semantically equivalent individuals may only exist in the same concept of the ontology 212. In each concept, semantically equivalent individuals can be identified using the first definition (1): If $S(e1)^{e1 \to e2} = S(e2)$, then $e1 \leftrightsquigarrow e2$.

The compressed ontology 222 can be generated or determined by keeping one individual for each set of semantically equivalent individuals. Other semantically equivalent individuals and/or related axioms can be removed from the ontology 212 or at least removed from consideration when resolving the query 210.

Exploring semantic relations, as illustrated in box 202, can reduce the time required to perform consistency checking at the individual level as there are often thousands of individuals in the same concept. However, exploring semantic relations of individuals in the same concept (in box 202) can include more than identifying semantically equivalent individuals. The semantically restricted relations among the remaining individuals can be determined at the same time or after the ontology has been compressed. Applying definitions (2) and (3) to the compressed ontology 222 can determine, for example, whether a given individual is more semantically restricted or less semantically restricted with respect to another individual in the compressed ontology 222 or in the ontology 212. This process can be performed iteratively for the individuals in a given concept to determine the semantic relations among the individuals in the concept in the compressed ontology 222.

However, there are often semantically restricted relations among concepts and/or between individuals in different concepts. The semantic relations among concepts and/or between individuals in different concepts can also be used to reduce the time required to perform consistency checking.

In box 204, semantic relations of individuals among different concepts and/or semantic relations among different concepts are explored when building, in box 206, the graph 208.

Semantic relations may be explored between concepts. Semantic relations between concepts can be determined by using the same or similar methods as (1), (2) and (3).

Given the ontology Σ and the query Q(x), where C1 and C2 are two concepts in Σ, and where C1 and C2 do not appear in Q(x), here $a^C$ denotes a is an individual of concept C, consistency checking can be reduced when individuals are semantically related through concepts. The following definitions can be used to reduce the number of consistency checking by using semantically restricted relationship among individuals belongs to different concepts in the ontology Σ.

If $C1 \leftrightsquigarrow C2$, then $\Sigma \models Q(a^{C1}) \Leftrightarrow \Sigma \models Q(b^{C2}), \forall a^{C1}, b^{C2}(S(a)^{C1 \to C2, a \to b} = S(b))$; (7)

If $C1 \leftharpoonup C2$, then $\Sigma \models Q(a^{C1}) \Leftarrow \Sigma \models Q(b^{C2}), \forall a^{C1}, b^{C2}(S(a)^{C1 \to C2, a \to b} \supseteq S(b))$; (8)

If $C1 \rightharpoonup C2$, then $\Sigma \models Q(a^{C1}) \Rightarrow \Sigma \models Q(b^{C2}), \forall a^{C1}, b^{C2}(S(a)^{C1 \to C2, a \to b} \subseteq S(b))$; (9)

When applying these definitions to explore semantic relations between concepts, the ontology Σ (such as the ontology 212), is usually processed from the bottom to the top. More specifically, concepts in a lowest level of the ontology Σ are processed first. Higher levels in the ontology Σ are processed iteratively until the top level and/or top concept is processed.

When processing semantic relations among concepts, axioms that are not relevant to consistency checking can be removed. For a concept C, by way of example and not limitation, the following axiom types in the ontology 212 may be removed: C(a), D ô C, Dô ∃R.C, and D ô≥nR.C.

After the axioms that are not relevant to consistency checking have been removed, semantically equivalent concepts can be identified or determined using the definition (1). Similarly, using definitions (2) and (3), semantic relations among concepts can be determined.

After exploring semantic relations of individuals in the same concept in box 202 and exploring relations of individuals among different concepts and/or semantic relations among concepts in box 204, the graph 208 is constructed in box 206.

The individuals in each concept can be addressed as follows based on the semantic relations previously determined:
  If $a1 \leftharpoonup a2$, then add $a1 \leftarrow a2$;
  If $a1 \rightharpoonup a2$, then add $a1 \to a2$.

Concepts are then addressed while building the graph 208 as follows:

If $C1 \looparrowright C2$, then add $a^{C1} \leftarrow b^{C2}$, where $a^{C1}, b^{C2}(S(a)^{C1 \rightarrow C2, a \rightarrow b} \supseteq S(b))$;

If $C1 \looparrowleft C2$, then add $a^{C1} \rightarrow b^{C2}$, where $a^{C1}, b^{C2}(S(a)^{C1 \rightarrow C2, a \rightarrow b} \subseteq S(b))$;

If $C1 \leftrightsquigarrow C2$, then add $a^{C1} \leftrightarrow b^{C2}$, where $a^{C1}, b^{C2}(S(a)^{C1 \rightarrow C2, a \rightarrow b} = S(b))$;

If $C1 \leftrightsquigarrow C2$, then replace C2 with C1 and explore semantically equivalent relations for individuals in C1. If $e1 \leftrightsquigarrow e2$, then add $e1 \leftrightarrow e2$, other semantic relations are processed as described herein. For example, If $e1 \looparrowright e2$, then add $e1 \leftarrow e2$. If $e1 \looparrowleft e2$, then add $e1 \rightarrow e2$. In this manner, by way of example, semantic relations among individuals in different concepts can be explored.

After exploring semantic relations of individuals in the same concept in box 202 and exploring relations of individuals among different concepts and/or semantic relations among concepts in box 204, the graph 208 is constructed in box 206.

FIGS. 3-7 show an illustrative example of building a semantically restricted graph. The semantically restricted graph can be used to answer queries or perform other applications. The generation of the semantically restricted graph can be performed offline.

Figure 3:
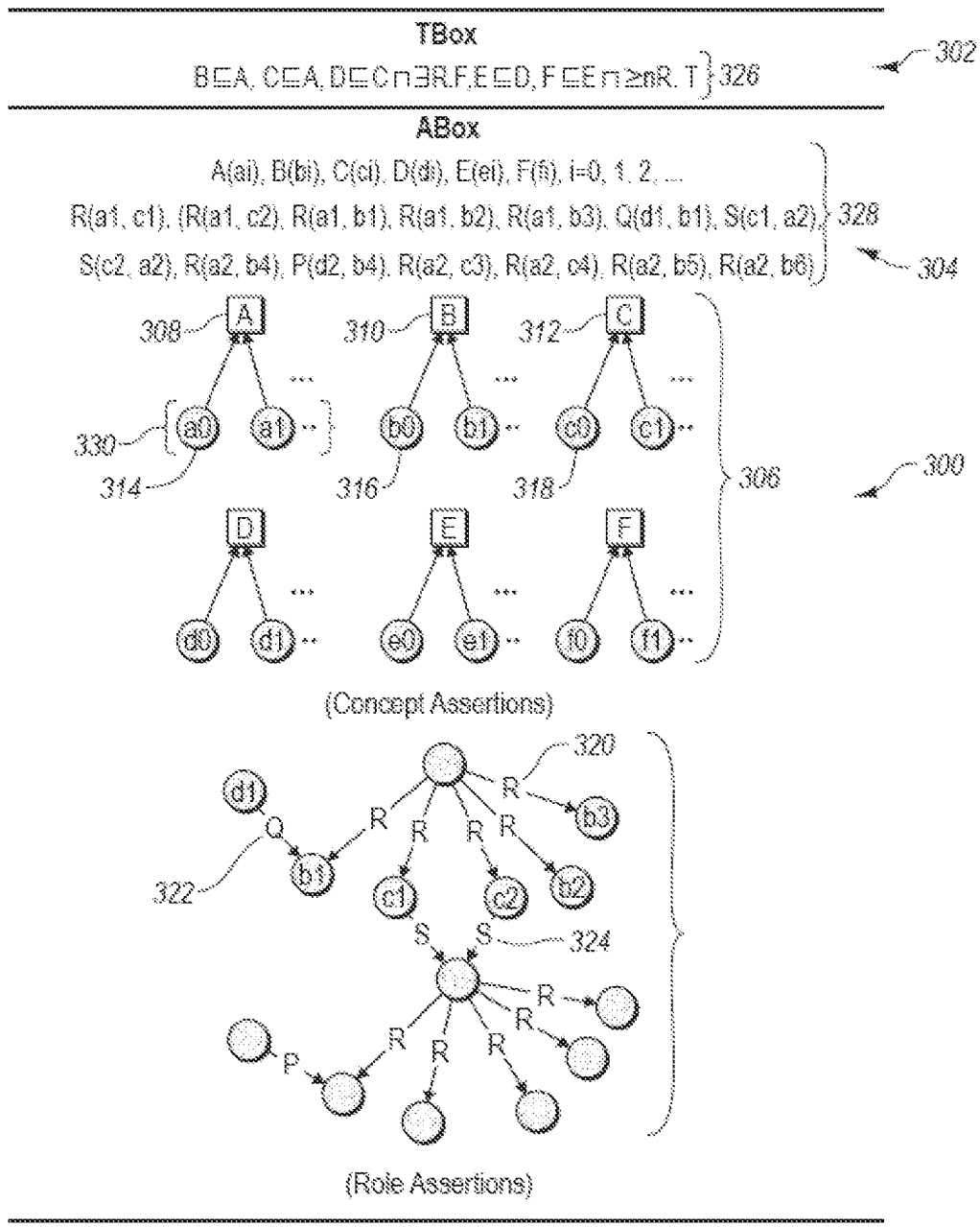
FIG. 3 shows an illustrative example of an ontology.

FIG. 3 shows an illustrative example of an ontology 300. The ontology 300 is an example of the knowledge base 100 and of the ontology 212. The ontology 300 includes a TBox 302, which is an example of the TBox 102, and an ABox 304, which is an example of the ABox 104. The TBox 302 includes axioms 326 and the ABox 304 includes axioms 328. Graphs 306 and 308 are also provided to graphically illustrate the Abox 304.

Concepts, such as concepts 308, 310, and 312, are represented by square nodes. Individuals, such as individuals 314, 316, and 318, are represented by circle nodes. The graph 306 illustrates concept assertions and the graph 308 illustrates role assertions including relations, for example, relations 320, 322, and 324.

Figure 4:
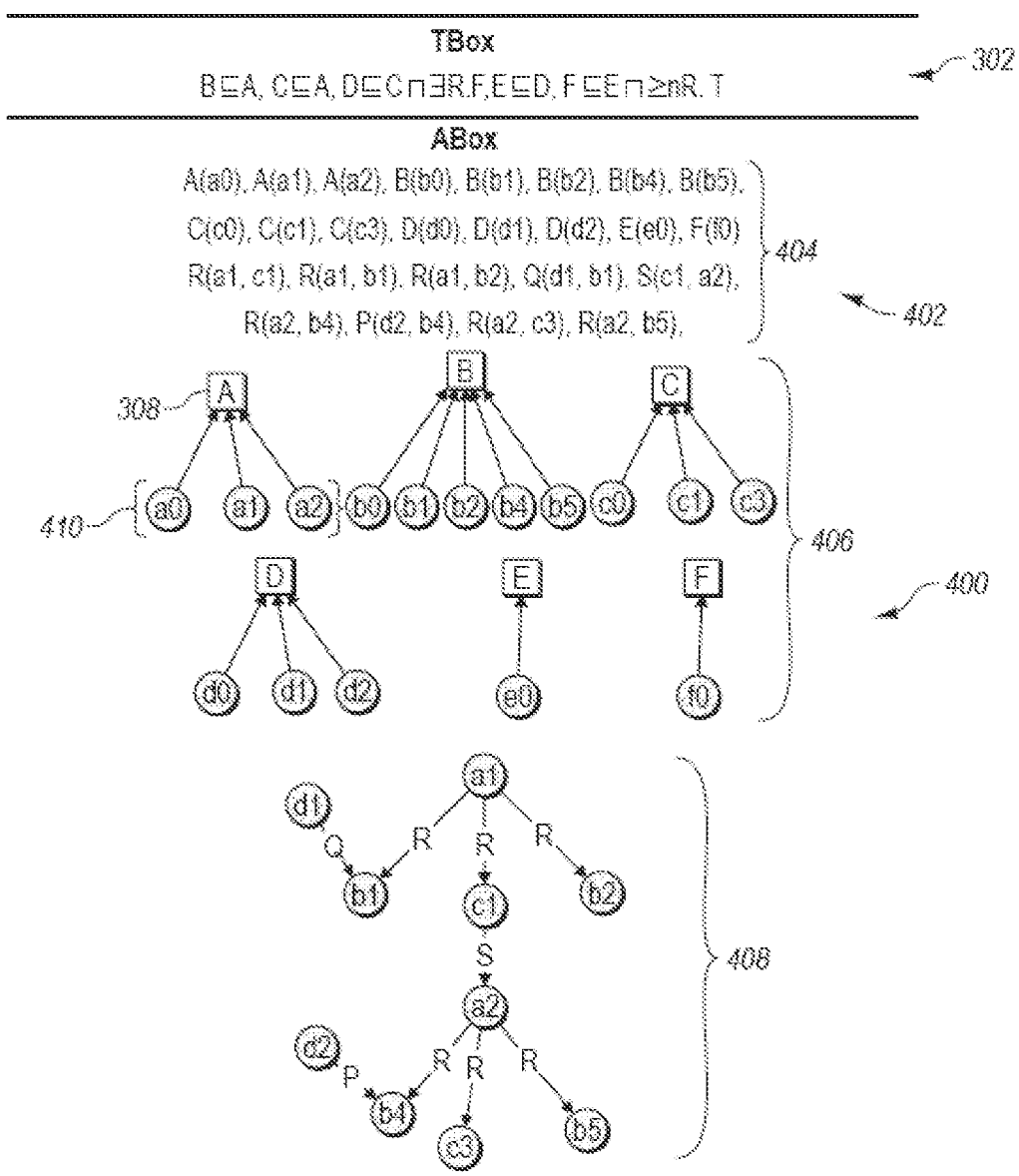
FIG. 4 shows an illustrative example of a compressed ontology.

FIG. 4 shows an illustrative example of a compressed ontology 400. The compressed ontology 400 is generated from the ontology 300. More specifically, generating the compressed ontology 400 includes exploring semantic relations in the ontology 300 in order to compress the ontology 300. Exploring the semantic relations in the ontology 300 enables the compressed ontology 400 to be generated by removing most of the semantically equivalent individuals. One of the semantically equivalent individuals is included in the compressed ontology 400.

More specifically, semantically equivalent individuals in each concept are identified. The compressed ontology 400 is generated from the ontology 300 by keeping only one of the semantically equivalent individuals for each set of equivalent individuals in each concept.

For example, FIG. 3 illustrates that the concept 308 includes individuals 330 (e.g., individuals a0-ai), where i may be large. FIG. 4 illustrates that the individuals 330 have been reduced to the individuals 410, which includes the individuals a0, a1, and a2 in this example.

In one example, a table or graph can be used to track the semantically equivalent individuals in each set when evaluating the individuals in the ontology 300. The table allows semantically equivalent individuals to be mapped to the individual that is retained in the compressed ontology 400.

Table 1, illustrated below, illustrates a partial mapping table for concept 308. In Table 1, the individuals a0, a3, . . . have been identified as semantically equivalent individuals and are mapped to the individual a0. The individual a0 is included in the individuals 410 in the compressed ontology 400. The semantically equivalent individuals b2, b3, have been mapped to the individual b2. The semantically equivalent individuals b5, b6, have been mapped to the individual b5. Table 1 illustrates, in this example, that all of the individuals in the concept A 308 have been mapped to three individuals. Other concepts in the ontology 300 have been similarly evaluated and mapped to generate the compressed ontology 400. As a result, the compressed ontology 400 may be substantially smaller than the original ontology 300. In addition, the ABox 402 may include fewer axioms 404.

TABLE 1

| Semantically Equivalent Individuals | Mapped Individuals |
|---|---|
| a0, a3, . . . | a0 |
| b2, b3 | b2 |
| b5, b6 | b5 |

For individuals a0, a3, there is only one axiom A(a0) which contains a0, $S(a0)=\{A(a0)\}$, and one axiom A(a3) which contains a3, $S(a3)=\{A(a3)\}$. When changing a3 to a0, $S(a3)^{a3 \rightarrow a0}=S(a0)$. As a result, the individuals a0 and a3 are semantically equivalent or $a0 \leftrightsquigarrow a3$. Similarly, the individuals a0 and aj are semantically equivalent, where j>3.

For individuals b2 and b3, $S(b2)=\{B(b2),R(a1,b2)\}$, $S(b3)=\{B(b3),R(a1,b3)\}$, and $S(b3)^{b3 \rightarrow b2}=S(b2)$. As a result, the individuals b2 and b3 are semantically equivalent, or $b2 \leftrightsquigarrow b3$. Other semantically equivalent individuals can be determined similarly. This process of identifying semantically equivalent individuals and only keeping one of the semantically equivalent individuals compresses the ontology 300 and results in the compressed ontology 400.

Similarly, the process of exploring semantic relations between individuals in different concepts results in a graph 408 of the role assertions. The Abox 402 is reduced in size compared to the Abox 304.

After the compressed ontology 400 is constructed, a semantically restricted relation graph may also be generated. The process of building the semantically restricted relation graph includes exploring the semantic relations of individuals in the same concept and exploring the semantic relations of individuals in different concepts.

More specifically, the construction of the compressed ontology 400 may include more than the identification of semantically equivalent individuals. The semantically restricted relation graph includes an analysis of instances of where one individual is more or less restrictive than another individual in the same or different concept.

Figure 5:
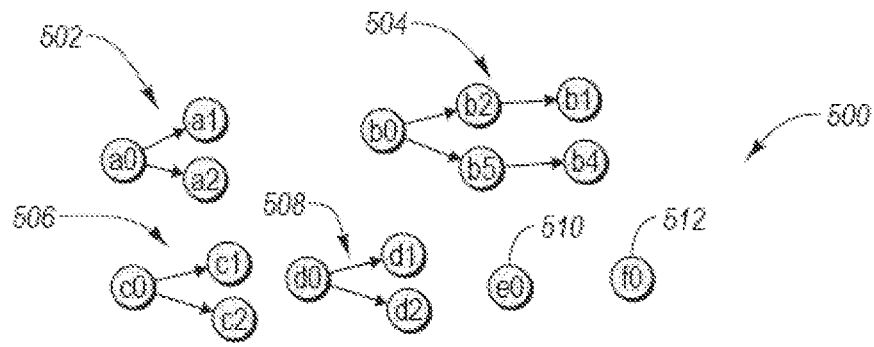
FIG. 5 illustrates an example of a graph depicting relations of individuals in each concept.

FIG. 5 illustrates an example of a graph 500 depicting relations of individuals in each concept. For individuals a0, a1 and a2:

$S(a0)=\{A(a0)\}$, $S(a1)=\{A(a1),R(a1,b1),R(a1,c1),R(a1,b2)\}$, and $S(a2)=\{A(a2),R(c1,a2),R(a2,b4),R(a2,c3),R(a2,b5)\}$.

Because $S^{a1 \rightarrow a0}(a1) \supseteq S(a0)$ and $S^{a2 \rightarrow a0}(a2) \supseteq S(a0)$, the individual a1 is more restricted than the individual a0, or $a0 \looparrowleft a1$. Similarly, the individual a2 is more restricted than the individual a0, or $a0 \looparrowleft a2$. A portion 502 of the graph 500 illustrates these relations among the individuals a0, a1, and a2 within the same concept. Portions 504, 506, 508, 510, and 512 can be similarly determined with respect to individuals in other concepts.

Figure 6:
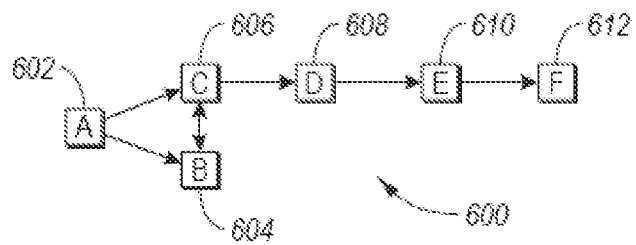
FIG. 6 shows an illustrative example of a graph depicting relations for concepts in the ontology.

FIG. 6 shows an illustrative example of a graph 600 for concepts in the ontology 300. The restricted graph 600 can be generated using, by way of example only, the definitions (1)-(3) previously stated. The restricted graph 600 can be generated iteratively beginning with the lowest-level concept. FIG. 6 illustrates that a concept 612 is more restrictive than a concept 610. A concept 608 is less restrictive than the concept 610. Concepts 606 and 604 are equivalent concepts. A concept 602 is a top level concept and is less restrictive than the concepts 604 and 606.

Figure 7:
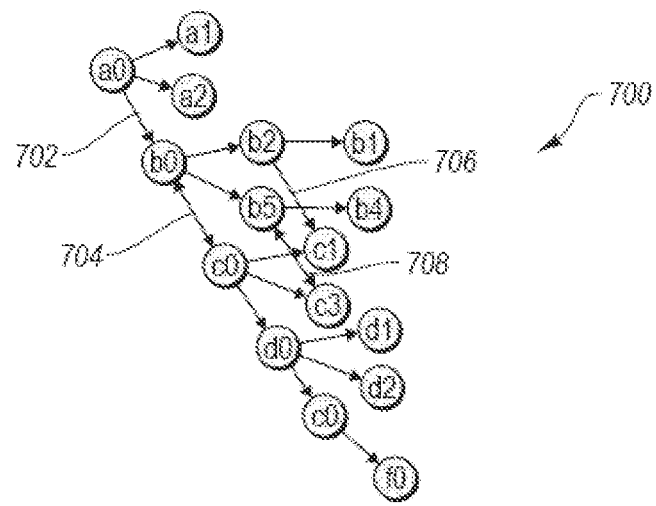
FIG. 7 shows an illustrative example of a semantically restricted relation graph.

FIG. 7 shows an illustrative example of a semantically restricted relation graph 700 (graph 700). The graph 700 can be generated from the compressed ontology 400, the information in the graphs 500 and 600, and by exploring semantically restricted relations identified in the graph 500 and in the graph 600.

For example, A↭B in FIGS. 5 and 6. Thus, a0↭b0 as illustrated by the relation 702, as S(a0)=A(a0), S(b0)=B(b0), and $S(a0)^{A \to B, a0 \to b0} \subseteq S(b0)$. FIGS. 5 and 6 illustrate that B↭C. In this example, b0↭c0 as illustrated by the relation 704. When C is replaced with B, then S(b2)={B(b2), R(a1, b2)}, S(b5)={B(b5), R(a2,b5)}, S(c1)={B(c1), R(a1,c1), R(c1,a2)}, S(c3)={B(c3), R(a2,c3)}. In this example, $S^{c1 \to b2}$(c1)⊇S(b2). As a result, b2↭c1 as illustrated by the relation 706. Because $S^{c3 \to b5}$(c1)=S(b2), b5↭c3 as illustrated by the relation 708. Other relations in the graph 700 can be determined in a similar manner.

The semantically restricted relation graph 700 illustrated in FIG. 7 can be used to answer queries and reduce the consistency checking requirements that would otherwise be performed in the ontology 300.

Figure 8:
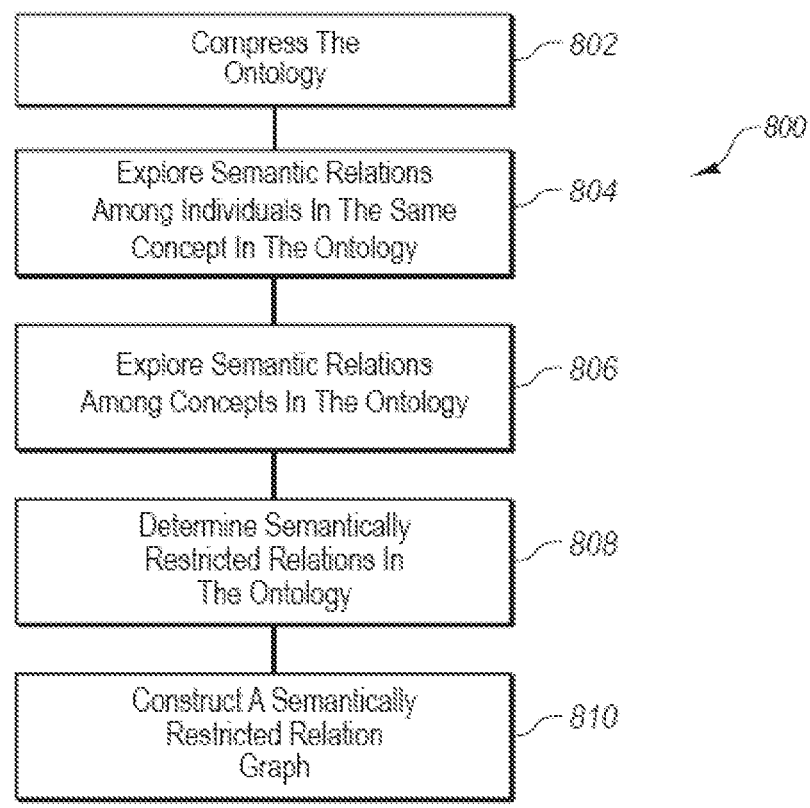
FIG. 8 shows an illustrative example of a method for facilitating a query in an ontology.

FIG. 8 shows an illustrative example of a method 800 for facilitating a query in an ontology. In box 802, ("Compress the Ontology"), the method 800 begins by compressing the ontology. Compressing the ontology can include identifying semantically equivalent individuals in each concept of the ontology. Semantically equivalent individuals, which usually occur within a concept, are mapped to a representative individual that is included in the compressed ontology.

In box 804 ("Explore Semantic Relations among Individuals in the Same Concept in the Ontology"), semantic relations of individuals belonging to the same concepts are explored. More specifically, the semantic relations in the compressed ontology or those individuals remaining in the same concepts after compressing the ontology are explored. While identifying semantically equivalent individuals can be considered to be part of exploring the semantic relations, exploring the semantic relations also includes identifying semantic relations such as whether one individual is more or less restrictive than another individual.

In box 806 ("Explore Semantic Relations among Concepts in the Ontology"), semantic relations among concepts are determined. This process continues in box 808 ("Determine Semantically Restricted Relations in the Ontology") where semantic relations for individuals belonging to different concepts in the ontology are further explored. This can include, for example, determining which individuals in one concept are less restrictive or more restrictive to other individuals of another concepts in the ontology.

In box 810 ("Construct a Semantically Restricted Relation Graph"), a semantically restricted graph is generated from the semantic relations previously determined in the boxes 802, 804, 806, and/or 808. In box 810, the semantic relationships are organized to form the semantically restricted relation graph.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 9:
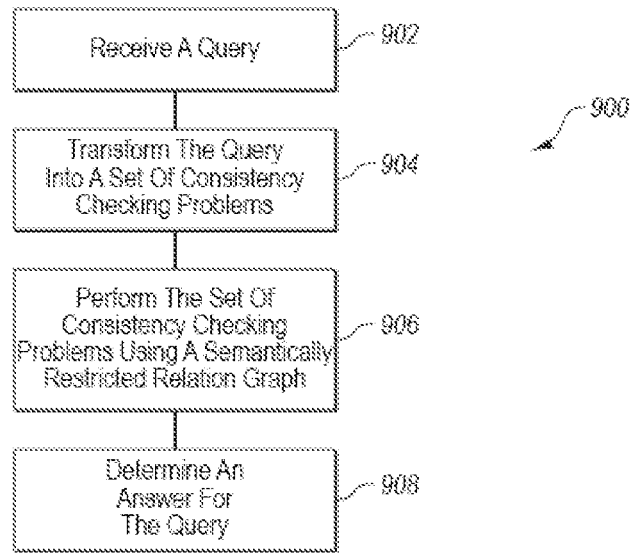
FIG. 9 shows an illustrative example of a method for performing a query in an ontology.

FIG. 9 shows an illustrative example of a method 900 for performing a query in an ontology. The method 900 often begins in box 902 ("Receive a Query"), where a query is received. The query may have a particular format or be constructed in accordance with an appropriate description language.

In box 904 ("Transform the Query into a Set of Consistency Problems"), the query is transformed into a set of consistency checking problems. For instance, given the compressed ontology O and a query {x}→Q(x), which operates to obtain all individuals in the ontology O that satisfy Q(x), then the query can be transformed into a set of consistency checking problems as {O|=Q(ai), for each individual ai in O}. In one embodiment, not all consistency checking problem need to be computed, and the number of the above consistency checking problems can be reduced by using a semantically restricted relation graph as described herein.

In box 906 ("Perform the Set of Consistency Checking Problems Using a Semantically Restricted Relation Graph"), the set of consistency checking problems is performed using the semantically restricted relation graph previously constructed. The semantically restricted relation graph, as previously stated, optimizes the process of performing the consistency checking problems because semantically equivalent individuals have been eliminated and because other semantic relations are also expressed in the semantically restricted graph. As a result, the time required to conduct the consistency checking problems is substantially reduced.

In block 908 (Determine an Answer for the Query"), an answer is determined for the query and returned. The answer to the query often includes the individuals identified in the semantically restricted relation graph while performing the consistency checking problems therein. In other words, a positive result for an individual in the consistency checking problems causes that individual to be included in the answer. The answer, however, may also include semantically equivalent individuals that are not included in the compressed ontology or in the semantically restricted relation graph.

Figure 10:
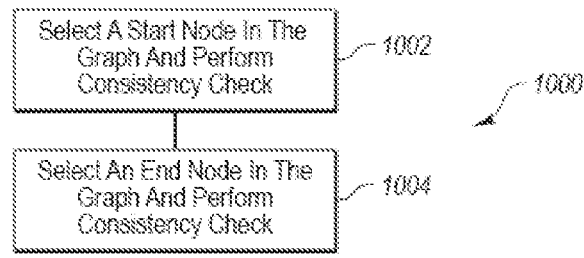
FIG. 10 shows an illustrative example of a method for performing consistency checking problems in a semantically restricted relation graph.

FIG. 10 shows an illustrative example of a method 1000 for performing consistency checking problems in a semantically restricted relation graph. The method 100 generally includes steps or acts that may be repeated iteratively until all nodes in the semantically restricted relation graph have been processed. In box 1002 ("Select a Start Node in the Graph and Perform Consistency Check"), a consistency check is performed for a start node.

The consistency check can take advantage of the definitions (4)-(9) that were previously applied while exploring the semantic relations in the ontology. In other words, the semantic relations between individuals and/or concepts are reflected in the semantically restricted relation graph and can be used when performing consistency checking.

For example, if the start node satisfies the consistency check, then all the direct and indirect successors of the start node also satisfy the consistency check. The direct and indirect successors no longer need to be checked for consistency in this case.

When the start node does not satisfy the consistency check, an end node is selected for consistency checking in box 1004 ("Select an End Node in the Graph and Perform Consistency Check"). Performing the consistency check on the end node can also benefit from the semantic relations that are reflected in the semantically restricted relation graph.

If the end node does not satisfy the query, then all of the direct and indirect ancestors (individuals) are not answers to the query and do not need to be checked. Boxes 1002 and 1004 can be iteratively performed until all nodes are processed. However, there is no requirement that the selection of nodes alternate between start nodes and end nodes. More than one end node or more than one start node can be processed.

The method 900 will be further described with respect to the semantically restricted relation graph 700 shown in FIG. 7. In this example, a query is received to retrieve all individuals which have a relation R(a,x), where a is an individual of concept A.

The method first selects the individual a0, which is the start node in the graph 700. A consistency check is performed: perform $\Sigma |= Q(a0)$. If the consistency check is not satisfied, the node a0 is marked as processed. Next, an end node f0 is selected and the consistency check is performed: perform $\Sigma |= Q(f0)$. The consistency check of the end node is not satisfied. As a result, all of the direct and indirect ancestors or nodes (e.g., individuals b0, c0, d0, and e0) are marked as processed. These steps illustrate that a consistency check was not performed directly on the nodes b0, c0, d0, and e0. The requirements of performing a consistency check are therefore reduced not only because the semantically restricted relation graph 700 has fewer nodes than the original ontology, but also because performing the consistency check can account for certain nodes or individuals in the semantically restricted relation graph 700 because of the semantic relations reflected in the semantically restricted relation graph 700.

Using a similar method, it can be determined that nodes or individuals a1, d1, a2, d2 are not answers of the query.

Next, another start node b2 is selected and the consistency check is performed: perform $\Sigma |= Q(b2)$. In this case, the node b2 satisfies the consistency check and the node b2 is added to the answer set. Further, all of the successors of the node b2 are deemed to satisfy the consistency check and are added to the answer set. Thus, the nodes b1 and c1 are added to the answer set. Using the table that maps semantically equivalent nodes to a single node in the semantically restricted relation graph, all of the semantically equivalent individuals for the nodes b2, b1, and c1 are added to the answer set.

An end node c3 is selected and the consistency check is performed: perform $\Sigma |= Q(c3)$. In this example, the consistency check is satisfied and the end node c3 is added to the answer set. All of the successor nodes (b5 and b4) are added to the answer set.

Once all of the nodes in the semantically restricted relation graph 700 are processed, the answer set is returned. The answer set includes, in this example: b1, b2, b4, b5, b6, c1, c3 (and their semantic equivalents).

Using the semantically restricted relation graph 700, the time required to perform consistency checking for a query can be substantially reduced.

Figure 11:
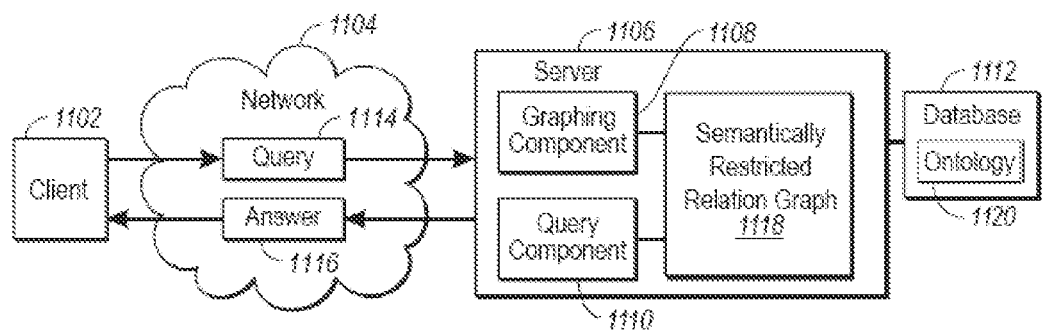
FIG. 11 shows an illustrative example of a system where queries are performed using a semantically restricted relation graph.

FIG. 11 shows an illustrative example of a system 1100 where queries are performed using semantically restricted relation graphs. In FIG. 11, a client 1102 may generate a query 1114 that is transmitted to a server 1106 over a network 1104. The query 1114 may be formulated in accordance with a description language, although the query 1114 may be freeform.

The server 1106 includes a graphing component 1108 and a query component 1110. The server 1106 also includes or has access to a database 1112, which may store an ontology 1120. The graphing component may be configured for generating a semantically restricted relation graph 1118 from the ontology 1120. The semantically restricted relation graph 1118 can be stored by the server 1106 locally and/or in the database 112 or in other storage. The semantically restricted relation graph 1118 can be generated offline.

The semantically restricted relation graph 1118 may include or identify semantically restricted relations among individuals and/or semantically restricted relations among concepts in the ontology 1120. In an embodiment, semantically equivalent individuals in the ontology 1120 are excluded from the semantically restricted relation graph 1118 except for a representative individual. In an example, the semantically restricted relation graph 1118 includes one individual for each set of semantically equivalent individuals in the ontology 1120.

The query component 1110 transforms the query 1114 into a set of consistency checking problems and interfaces with the semantically restricted relation graph 1118 to perform the set of consistency checking problems using the semantically restricted relation graph 1118. The query component 1110 may return an answer 1116 to the query 1114 to the client 1102 over the network 1104.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

Figure 12:
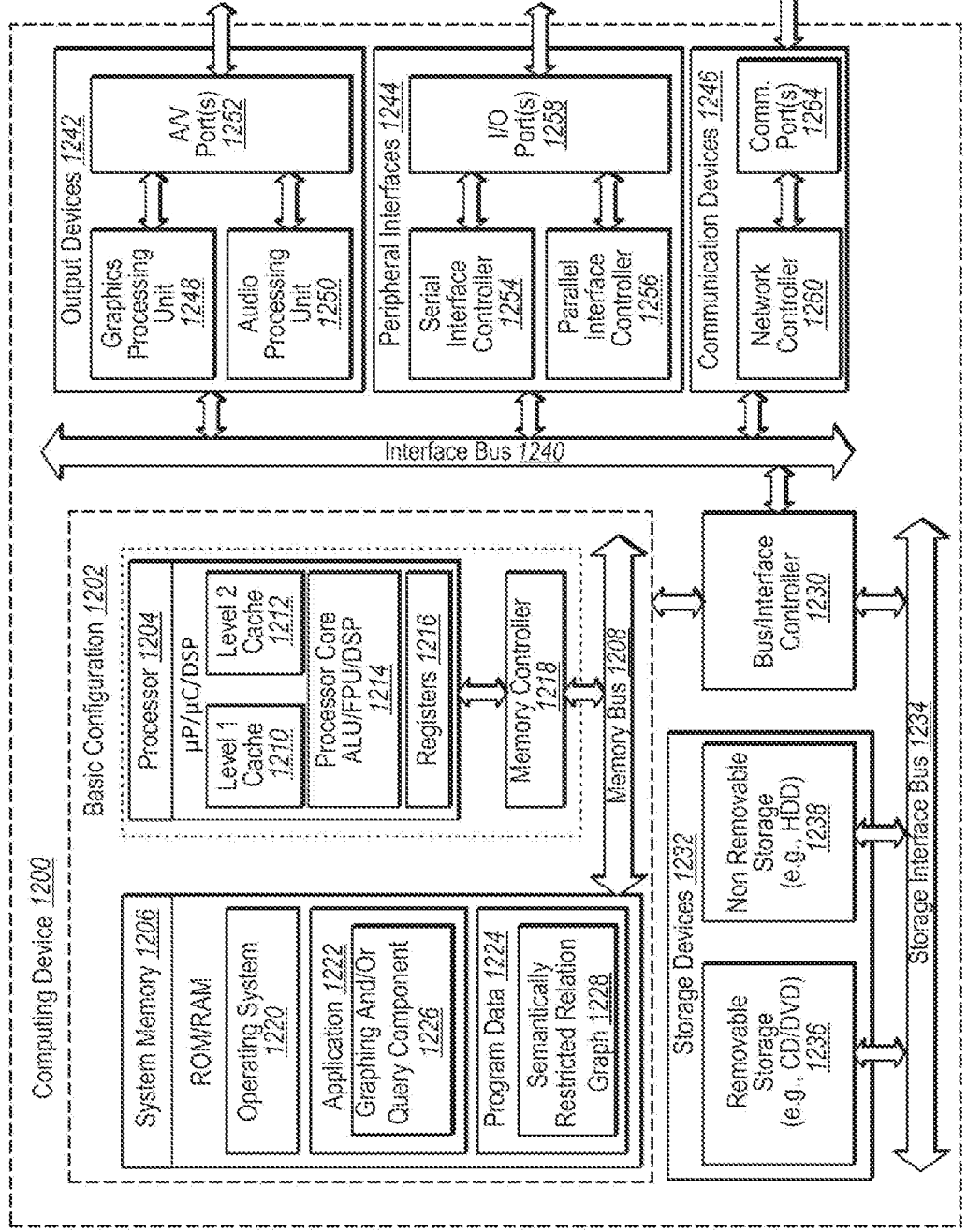
FIG. 12 depicts a block diagram illustrating an example computing device that is arranged to implement performing a query using semantic relations in an ontology, arranged in accordance with some embodiments of the present disclosure.

FIG. 12 is a block diagram of an illustrative embodiment of a computing device 1200 that is arranged for performing queries in an ontology and/or for generating semantically restricted relation graphs for ontologies. In a very basic configuration 1202, computing device 1200 typically includes one or more processors 1204 and a system memory 1206. A memory bus 1208 may be used for communicating between processor 1204 and system memory 1206.

Depending on the desired configuration, processor 1204 may be of any type including but not limited to a microprocessor (µP), a microcontroller (µC), a digital signal processor (DSP), or any combination thereof. Processor 1204 may include one more levels of caching, such as a level one cache 1210 and a level two cache 1212, a processor core 1214, and registers 1216. An example processor core 1214 may include an arithmetic logic unit (ALU), a floating point unit (FPU), a digital signal processing core (DSP Core), or any combination thereof. An example memory controller 1218 may also be used with processor 1204, or in some implementations memory controller 1218 may be an internal part of processor 1204.

Depending on the desired configuration, system memory 1206 may be of any type including but not limited to volatile memory (such as RAM), non-volatile memory (such as ROM, flash memory, etc.) or any combination thereof. System memory 1206 may include an operating system 1220, one or more applications 1222, and program data 1224. Application 1222 may include a graphing component and/or query component 1226 that are arranged or configured to perform a query in an ontology using semantically restricted relation graphs. Program data 1224 may include a semantically restricted relation graph data 1228 for performing queries and/or performing consistency checking. In some embodiments, application 1222 may be arranged to operate with program data 1224 on operating system 1220 such that a semantically restricted relation graph for an ontology is generated. This described basic configuration 1202 is illustrated in FIG. 12 by those components within the inner dashed line.

Computing device 1200 may have additional features or functionality, and additional interfaces to facilitate communications between basic configuration 1202 and any required devices and interfaces. For example, a bus/interface controller 1230 may be used to facilitate communications between basic configuration 1202 and one or more data storage devices 1232 via a storage interface bus 1234. Data storage devices 1232 may be removable storage devices 1236, non-removable storage devices 1238, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 1206, removable storage devices 1236 and non-removable storage devices 1238 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 1200. Any such computer storage media may be part of computing device 1200.

Computing device 1200 may also include an interface bus 1240 for facilitating communication from various interface devices (e.g., output devices 1242, peripheral interfaces 1244, and communication devices 1246) to basic configuration 1202 via bus/interface controller 1230. Example output devices 1242 include a graphics processing unit 1248 and an audio processing unit 1250, which may be configured to communicate to various external devices such as a display or speakers via one or more A/V ports 1252. Example peripheral interfaces 1244 include a serial interface controller 1254 or a parallel interface controller 1256, which may be configured to communicate with external devices such as input devices (e.g., keyboard, mouse, pen, voice input device, touch input device, etc.) or other peripheral devices (e.g., printer, scanner, etc.) via one or more I/O ports 1258. An example communication device 1246 includes a network controller 1260, which may be arranged to facilitate communications with one or more other computing devices 1262 over a network communication link via one or more communication ports 1264.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 1200 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 1200 may also be implemented as a personal computer including both laptop computer and non-laptop computer configurations.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method for preparing an ontology for searching, the method comprising:
   compressing an ontology such that one individual in each set of semantically equivalent individuals in a same concept remains in a compressed ontology;
   determining semantically equivalent relations among the one individual and individuals in different concepts in the compressed ontology;
   determining semantically restricted relations among the one individual and other individuals in the different concepts in the compressed ontology;
   determining semantically equivalent concepts among the same and different concepts in the compressed ontology;
   determining semantically restricted relations among the same and different concepts in the compressed ontology; and
   constructing a semantically restricted relation graph based at least on the semantically restricted relations among the one individual and the other individuals and the semantically restricted relations among the same and different concepts, wherein a query is answered using the semantically restricted relation graph.

2. The method of claim 1, wherein compressing the ontology further comprises identifying the semantically equivalent individuals in each concept of the ontology.

3. The method of claim 2, further comprising removing at least some of the semantically equivalent individuals from the ontology.

4. The method of claim 1, further comprising determining semantically restricted relations among individuals in the same concept in the compressed ontology.

5. The method of claim 1, wherein constructing a semantically restricted relation graph comprises placing individuals in the semantically restricted relation graph based on the semantically restricted relations among the individuals.

6. The method of claim 1, wherein constructing a semantically restricted relation graph comprises placing concepts in the semantically restricted relation graph based on the semantically restricted relations among the concepts.

7. The method of claim 1, wherein determining the semantically restricted relations among the same and different concepts comprises beginning with concepts in a lowest level of the ontology to concepts in a top level in the ontology.

8. The method of claim 1, further comprising performing the query using the semantically restricted relation graph.

9. The method of claim 8, wherein performing the query comprises transforming the query into a set of consistency checking problems.

10. The method of claim 9, further comprising iteratively processing nodes in the semantically restricted relation graph to answer the query, wherein iteratively processing nodes includes:
    selecting a start node to perform the consistency checking, wherein all direct and indirect successors of the selected node are answers to the query when the selected node is an answer and wherein consistency checking is not performed on the direct and indirect successors of the selected node; and
    selecting an end node to perform the consistency checking, wherein all direct and indirect ancestors are not answers of the query when the end node is not an answer to the query.

11. A method for performing a query in an ontology, the method comprising:
    receiving a query at a server that provides access to the ontology;
    transforming the query into a set of consistency checking problems;
    constructing a semantically restricted relation graph from the ontology, comprising:
        determining a first set of axioms in the ontology, wherein each axiom in the first set contains a first individual;
        determining a second set of axioms in the ontology, wherein each axiom in the second set contains a second individual;
        replacing the first individual in all of the axioms of the first set with the second individual to form a third set of axioms that contains the second individual;
        determining whether the second set is a subset of the third set;
        in response to a determination that the second set is a subset of the third set, determining the second individual is more semantically restricted than the first individual;
        determining a first additional set of axioms in the ontology, wherein each axiom in the first additional set contains a first concept;
        determining a second additional set of axioms in the ontology, wherein each axiom in the second additional set contains a second concept;
        replacing the first concept in all of the axioms of the first additional set with the second concept to form a third additional set of axioms that contains the second concept;
        determining whether the second additional set of axioms is a subset of the third additional set of axioms;
        in response to a determination that the second additional set of axioms is a subset of the third additional set of axioms, determining the second concept is more semantically restricted than the first concept;
    performing the set of consistency checking problems using the semantically restricted relation graph, wherein the semantically restricted relation graph includes semantically restricted relations determined among the first individual and the second individual and among the first concept and the second concept, wherein each set of semantically equivalent individuals in the ontology is represented by one individual in the semantically restricted relation graph; and
    determining an answer for the query from the semantically restricted relation graph.

12. The method of claim 11, wherein the semantically restricted relation graph is generated offline and accessed when the query is received to answer the query.

13. The method of claim 11, wherein determining the answer for the query comprises iteratively performing:
    selecting a node in the semantically restricted relation graph;
    adding all direct and indirect nodes of the selected node to the answer if the selected node is the answer to the query; and
    checking an end node when the selected node is not the answer, wherein all direct and indirect nodes that are successors of the end node are not answers and are not checked for consistency.

14. The method of claim 11, wherein a consistency check is performed for less than all the nodes in the restricted relation graph when determining the answer for the query.

15. A system for performing a query in a large data set, the system comprising:

a server having access to a database stored in a memory, the database storing an ontology;

a graphing component configured for generating a semantically restricted relation graph from the ontology, wherein the semantically restricted relation graph is stored in the memory and wherein the semantically restricted relation graph includes semantically restricted relations among individuals and semantically restricted relations among concepts, and wherein at least some semantically equivalent individuals in a same concept and some semantically equivalent individuals in different concepts in the ontology are excluded from the semantically restricted relation graph; and a query component that interfaces with the semantically restricted relation graph, wherein the query component transforms the query into a set of consistency checking problems that are performed on the semantically restricted relation graph to generate results of the query.

16. The system of claim 15, wherein at least some axioms and other individuals are excluded from the semantically restricted relation graph.

17. The system of claim 15, wherein the set of consistency checking problems are performed on less than all the nodes in the semantically restricted relation graph.

18. The system of claim 15, wherein the semantically restricted relation graph is generated offline to improve a time required to perform the set of consistency checking problems.

* * * * *

UNITED STATES PATENT AND TRADEMARK OFFICE
CERTIFICATE OF CORRECTION

PATENT NO. : 9,245,049 B2
APPLICATION NO. : 13/496773
DATED : January 26, 2016
INVENTOR(S) : Fang It is certified that error appears in the above-identified patent and that said Letters Patent is hereby corrected as shown below:

In the Specification:

In Column 1, below Title, insert -- CROSS-REFERENCE TO RELATED APPLICATION
The present application is the U.S. National Stage filing under 35 U.S.C. § 371 of
International Application No. PCT/CN2011/071013, filed on February 16, 2011. --.

In Column 1, Lines 61-62, delete "determined Semantically" and insert -- determined. Semantically --, therefor.

In Column 2, Line 67, delete "hereof In" and insert -- hereof. In --, therefor.

In Column 4, Line 6, delete "α2: Man ΠWoman ô τ" and insert -- α2: Man Π Woman ô τ --, therefor.

In Column 4, Line 21, delete "Abox 104" and insert -- ABox 104 --, therefor.

In Column 5, Line 14, delete "e2;" and insert -- e2. --, therefor.

In Column 5, Line 44, delete "forgoing" and insert -- foregoing --, therefor.

In Column 6, Line 42, delete "S(b));" and insert -- S(b)). --, therefor.

In Column 7, Line 33, delete "Abox 304." and insert -- ABox 304. --, therefor.

In Column 8, Lines 38-39, delete "Abox 402 is reduced in size compared to the Abox 304." and insert -- ABox 402 is reduced in size compared to the ABox 304. --, therefor.

In Column 9, Line 23, delete "$S^{c3 \to b}5(c1) = S(b2)$," and insert -- $S^{c3 \to b5}(c1) = S(b2)$, --, therefor.

In Column 10, Line 47, delete "method 100" and insert -- method 1000 --, therefor.

Signed and Sealed this
Ninth Day of August, 2016

Michelle K. Lee
*Director of the United States Patent and Trademark Office*

In Column 12, Line 2, delete "database 112" and insert -- database 1112 --, therefor.

In Column 13, Line 19, delete "and or" and insert -- and/or --, therefor.